US012732782B2

(12) United States Patent
Taylor

(10) Patent No.: US 12,732,782 B2
(45) Date of Patent: Sep. 8, 2026

(54) TRANSMISSION OF SENSOR DATA

(71) Applicant: Airbus Defence and Space Limited, Stevenage Hertfordshire (GB)

(72) Inventor: Stuart Taylor, Stevenage Hertfordshire (GB)

(73) Assignee: Airbus Defence and Space Limited, Stevenage Hertfordshire (GB)

( * ) Notice: Subject to any disclaimer, the term of this patent is extended or adjusted under 35 U.S.C. 154(b) by 286 days.

(21) Appl. No.: 18/560,121

(22) PCT Filed: May 13, 2022

(86) PCT No.: PCT/GB2022/051216
§ 371 (c)(1),
(2) Date: Nov. 10, 2023

(87) PCT Pub. No.: WO2022/238714
PCT Pub. Date: Nov. 17, 2022

(65) Prior Publication Data

US 2024/0244404 A1 Jul. 18, 2024

(30) Foreign Application Priority Data

May 14, 2021 (GB) ..................................... 2106931

(51) Int. Cl.
*G06T 7/11* (2017.01)
*G06T 7/20* (2017.01)
(Continued)

(52) U.S. Cl.
CPC ................. *H04W 4/38* (2018.02); *G06T 7/11* (2017.01); *G06T 7/20* (2013.01); *G06V 10/70* (2022.01);
(Continued)

(58) Field of Classification Search
CPC ... H04W 4/38; G06T 7/11; G06T 7/20; G06V 20/17; G06V 10/70; G06V 2201/07; H04N 7/185
See application file for complete search history.

(56) References Cited

U.S. PATENT DOCUMENTS

| | | | | |
|---|---|---|---|---|
| 2003/0174773 A1* | 9/2003 | Comaniciu | ............ | H04N 7/141 375/E7.14 |
| 2016/0173833 A1* | 6/2016 | Siann | ..................... | H04N 7/185 348/143 |

(Continued)

FOREIGN PATENT DOCUMENTS

| | | |
|---|---|---|
| WO | 2018164785 A1 | 9/2018 |
| WO | 2020241269 A1 | 12/2020 |

OTHER PUBLICATIONS

International Search Report for corresponding International Patent Application No. PCT/GB2022/051216 dated Jun. 20, 2022; priority document.

*Primary Examiner* — Syed Haider
(74) *Attorney, Agent, or Firm* — Greer, Burns & Crain, Ltd.

(57) ABSTRACT

A method of transmitting sensor data from a mobile data collector to a supervising node over a wireless communications channel, the method comprising: performing computer object detection on sensor data collected by the mobile data collector; responsive to the computer object detection identifying an object of interest within the sensor data collected by the mobile data collector, generating a first subset of the sensor data associated with the object of interest, and generating a second subset of the sensor data not associated with the object of interest; transmitting the first subset of the sensor data at a first transmission rate from the mobile data collector to the supervising node via the wireless communications channel; and transmitting the second subset of the (Continued)

sensor data at a second transmission rate from the mobile data collector to the supervising node via the wireless communications channel, wherein the first transmission rate is greater than the second transmission rate.

20 Claims, 7 Drawing Sheets

(51) Int. Cl.
*G06V 10/70* (2022.01)
*G06V 20/17* (2022.01)
*H04W 4/38* (2018.01)

(52) U.S. Cl.
CPC .......... *G06V 20/17* (2022.01); *G06V 2201/07* (2022.01)

(56) References Cited

U.S. PATENT DOCUMENTS

2016/0345260 A1* 11/2016 Johnson ............... H04N 23/661
2017/0251169 A1* 8/2017 Meier ...................... H04N 5/77
2020/0013172 A1* 1/2020 Shibuya ................. G06V 20/52
2020/0159223 A1* 5/2020 Egner ..................... H04S 7/302
2020/0322571 A1 10/2020 Awai
2021/0266478 A1* 8/2021 Nagumo ................. G06T 7/207
2021/0289145 A1 9/2021 Woody et al.
2022/0224918 A1 7/2022 Maeda

* cited by examiner 114b
110
130a

TRANSMISSION OF SENSOR DATA

CROSS-REFERENCES TO RELATED APPLICATIONS

This application claims the benefit of the International Application No. PCT/GB2022/051216, filed on May 13, 2022, and of the Great Britain patent application No. 2106931.5 filed on May 14, 2021, the entire disclosures of which are incorporated herein by way of reference.

FIELD OF THE INVENTION

The present disclosure concerns transmission of sensor data. More particularly, but not exclusively, this disclosure concerns measures, including methods, apparatus and computer programs, for use in transmitting sensor data in a system comprising a mobile data collector in communication with a supervising node over a wireless communications channel.

BACKGROUND OF THE INVENTION

Intelligence, surveillance and reconnaissance (ISR) is the coordinated and integrated acquisition, processing and provision of timely, accurate, relevant, coherent and assured information and intelligence to support a commander's conduct of activities.

Commonly, a wireless communications channel between one or more ISR mobile data collectors and an ISR supervising node has constrained bandwidth. For example, the wireless communications channel may be provided by a communications satellite. Known systems stream data continuously from the ISR mobile data collector(s) to the ISR supervising node, typically at the maximum transmission rate supported by the wireless communications channel at any given point in time. If the available bandwidth on the communications channel will not support the transmission of the ISR data, the data is usually stored on-board the data collector for later recovery and processing. Some systems allow an operator to manually adjust the transmission rate. For example, when pertinent intelligence is spotted by an operator within the field of view of a particular ISR mobile data collector, an operator may manually increase the transmission rate from that particular ISR mobile data collector, for example to support streaming of video data from the ISR mobile data collector to the supervising node at a higher resolution. However, the reconfiguring of data transmission rates in known ISR systems is a manual operation performed by an operator and therefore relies on an operator successfully spotting pertinent intelligence in the first place. This may result in otherwise valuable intelligence being overlooked as a result of operator error or operator unavailability. Furthermore, in the case of an unmanned data collector, an operator/analyst at the supervising node would generally not have access to as high a quality feed as the original source on the data collector, thus making it more difficult to detect pertinent intelligence, e.g., due to the limited resolution of images received at the supervising node.

The present disclosure seeks to ameliorate the configuration of transmission rates, with applications in, but not limited to, improved ISR systems.

SUMMARY OF THE INVENTION

According to a first aspect, there is provided a method of transmitting sensor data from a mobile data collector to a supervising node over a wireless communications channel, the method comprising:

performing computer object detection on sensor data collected by the mobile data collector;

responsive to the computer object detection identifying an object of interest within the sensor data collected by the mobile data collector, generating a first subset of the sensor data associated with the object of interest, and generating a second subset of the sensor data not associated with the object of interest;

transmitting the first subset of the sensor data at a first transmission rate from the mobile data collector to the supervising node via the wireless communications channel; and transmitting the second subset of the sensor data at a second transmission rate from the mobile data collector to the supervising node via the wireless communications channel, wherein the first transmission rate is greater than the second transmission rate.

According to a second aspect, there is provided a method of transmitting sensor data from a mobile data collector to a supervising node over a wireless communications channel, the method comprising:

performing computer object detection on sensor data collected by the mobile data collector;

responsive to the computer object detection identifying an object of interest within the sensor data collected by the mobile data collector, generating a subset of the sensor data associated with the object of interest; and transmitting the subset of the sensor data from the mobile data collector to the supervising node via the wireless communications channel.

According to a third aspect, there is provided apparatus comprising a mobile data collector connected to a supervising node over a wireless communications channel, the apparatus being configured to:

perform computer object detection on sensor data collected by the mobile data collector;

responsive to the computer object detection identifying an object of interest within the sensor data collected by the mobile data collector, generate a first subset of the sensor data associated with the object of interest, and generate a second subset of the sensor data not associated with the object of interest;

transmit the first subset of the sensor data at a first transmission rate from the mobile data collector to the supervising node via the wireless communications channel; and transmit the second subset of the sensor data at a second transmission rate from the mobile data collector to the supervising node via the wireless communications channel, wherein the first transmission rate is greater than the second transmission rate.

According to a fourth aspect, there is provided a computer program comprising a set of instructions, which, when executed by computerized apparatus, cause the computerized apparatus to perform a method of transmitting sensor data from a mobile data collector to a supervising node over a wireless communications channel, the method comprising:

performing computer object detection on sensor data collected by the mobile data collector;

responsive to the computer object detection identifying an object of interest within the sensor data collected by the mobile data collector, generating a first subset of the sensor data associated with the object of interest, and generating a second subset of the sensor data not associated with the object of interest;

transmitting the first subset of the sensor data at a first transmission rate from the mobile data collector to the supervising node via the wireless communications channel; and transmitting the second subset of the sensor data at a second transmission rate from the mobile data collector to the supervising node via the wireless communications channel, wherein the first transmission rate is greater than the second transmission rate.

BRIEF DESCRIPTION OF THE DRAWINGS

Embodiments of the present disclosure will now be described by way of example only with reference to the accompanying schematic drawings of which.

DETAILED DESCRIPTION OF THE PREFERRED EMBODIMENTS

Figure 1:
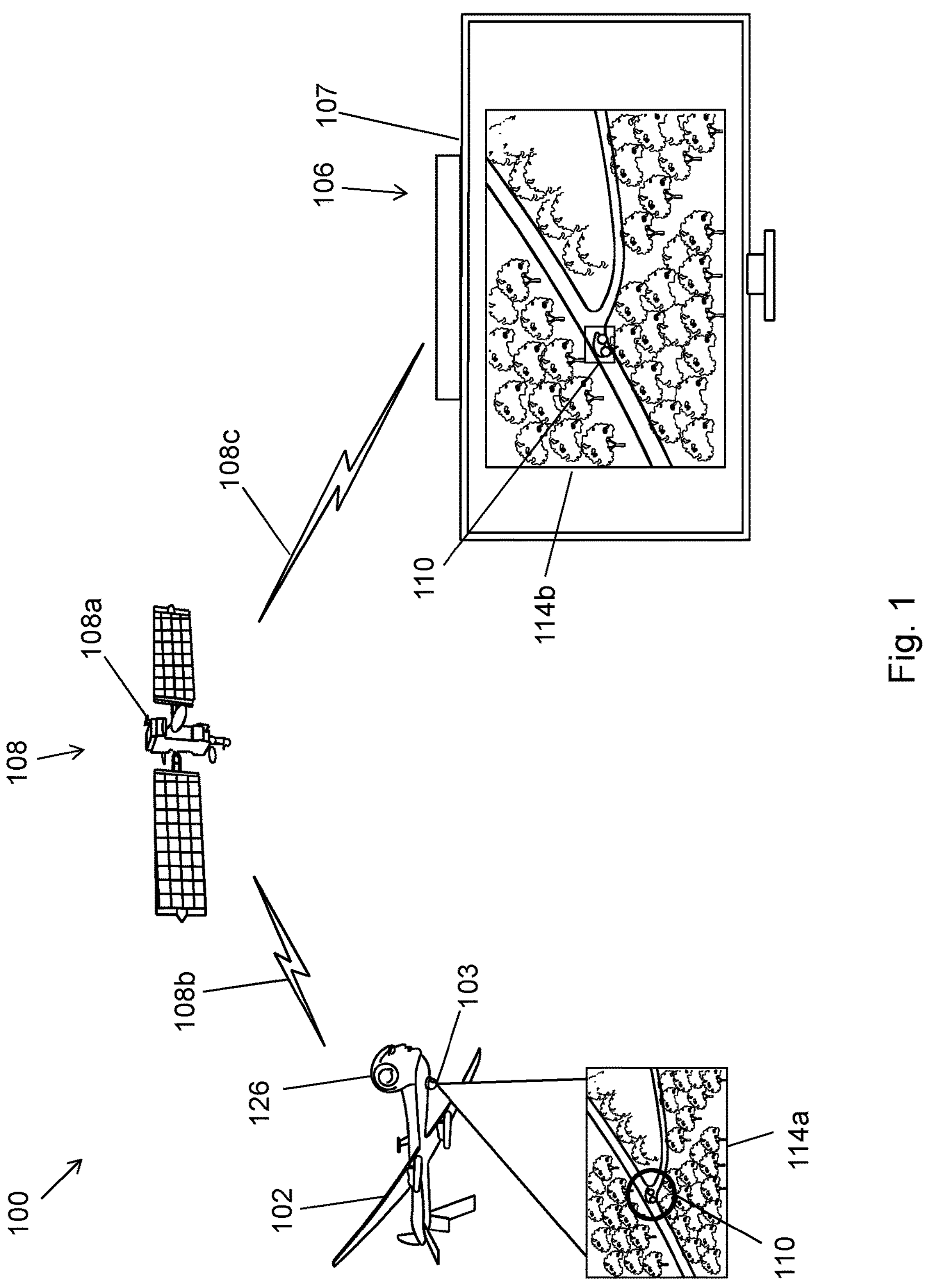
FIG. 1 shows a schematic view of an apparatus according to embodiments of the present disclosure.

Referring to FIG. 1, there is shown an apparatus 100 which may form part of an intelligence, surveillance and reconnaissance (ISR) system. The apparatus comprises a mobile data collector (DC) 102 in communication with a supervising node (SN) 106 over a wireless communications channel 108. In embodiments, the DC 102 is an intelligence data collector, such as an unmanned aerial vehicle (UAV) or drone. The SN 106 is typically situated remotely at a command post where it may be at least partially operated by a human operator. In embodiments, the wireless communications channel 108 is provided, at least partially, by a communications satellite 108*a*. Specifically, a first wireless data transmission path (or 'wireless communication path') 108*b* exists between the DC 102 and the satellite 108*a* and a second wireless data transmission path (or 'wireless communication path') 108*c* exists between the satellite 108*a* and the SN 106. However, a satellite may not be employed and alternative bearers for the transmission of data from the DC to the SN are contemplated, such as terrestrial radio frequency and/or microwave links and the like.

Examples of the functionality of the apparatus 100 will now be described.

Sensor data are transmitted from the DC 102 to the SN 106 over the wireless communications channel 108. The sensor data could be derived from a number of different sensor types or combinations thereof applicable to intelligence gathering operations. In embodiments, the DC 102 comprises a video capture device 103 (VCD). As such, the sensor data transmitted from the DC 102 to the SN 106 may comprise video data. The VCD may operate in the visible light domain, or alternatively or in addition also in the infrared, ultraviolet or x-ray domains. It should be appreciated that the DC may include one or more additional VCDs capturing complementary video data. For example, additional VCDs may have partially or completely non-overlapping fields of view with other VCDs to provide additional angular spatial coverage at the DC. In some embodiments, the total angular coverage of the DC may be 360 degrees. References to sensor data herein may include combined sensor data captured from two or more VCDs on the single DC. Additional sensor types may also be provided on the DC, such as radar devices, microphones, and/or spectrum analyzers, for example. It should be appreciated that aspects described herein with reference to video sensor data apply similarly to other types of sensor data.

During operations, the VCD 103 of the DC 102 captures a scene 114*a*, corresponding to a reconnaissance target site, for example. The SN 106 receives transmitted sensor data via the wireless communications channel 108 and reproduces the sensor data for analysis by an operator. For example, the SN 106 may comprise a visual display unit (VDU) 107 which displays a video feed 114*b* based on the video data transmitted from the DC 102 to the SN 106. It should be appreciated that scene 114*a* corresponds to the raw sensor data captured by the VCD 103 of the DC 102, whereas displayed video feed 114*b* corresponds to a reconstructed/received video feed based on video (sensor) data transmitted from the DC 102 to the SN 106.

The apparatus 100 performs computer object detection on sensor data collected by the DC 102. Computer object detection is a computer technology related to computer vision and image processing that deals with detecting instances of objects of a certain class (such as humans, buildings, or cars) in digital imagery and videos. It will be appreciated that computer object detection may be performed not only on imagery and videos captured in the visible light domain, but that it is also applicable to data captured in other regions of the electromagnetic spectrum such as x-ray, ultraviolet and/or infrared imagery. The skilled person would be familiar with implementation details relating to computer object detection and therefore precise implementation details are not provided herein.

Responsive to the computer object detection identifying an object of interest (OOI) 110 within the sensor data collected by the DC 102, the apparatus 100 generates a first subset of the sensor data associated with the OOI 110, and generates a second subset of the sensor data not associated with the OOI 110. The first subset of the sensor data (associated with the OOI) is transmitted from the DC 102 to the SN 106 at a first transmission rate, and the second subset of the sensor data (not associated with the OOI) is transmitted from the DC 102 to the SN 106 at a second transmission rate. The first transmission rate is greater than the second transmission rate. In this manner, transmission of sensor data from the DC 102 to the SN 106 is prioritized for those portions of the captured sensor data which are associated with an OOI 110. This allows portions of the captured sensor data comprising an OOI 110 to be transmitted at a higher quality than portions not comprising an OOI, for example.

It should be appreciated that the sensor data may also comprise an analogue signal, whereby transmission rates are governed by the utilized modulation bandwidth of a carrier signal, for example. It should be appreciated that the sensor data transmitted from the DC 102 to the SN 106 may comprise a combination of digital and analogue data, whereby the transmission rate is governed by the bit rate of digital data transmission in addition to the modulation bandwidth of a carrier signal, for example.

In embodiments, prior to the computer object detection identifying an OOI 110 within the sensor data collected by the DC 102, sensor data are transmitted to the SN 106 at a default transmission rate. This is in general less than the first transmission rate and, in some embodiments, could even be zero. This means that unless and until an OOI 110 is detected, sensor data are streamed from the DC 102 to the SN 106 either at a lower quality, or not at all. The latter has the effect that the operator of the SN 106 is not burdened with having to analyze/review sensor data which do not contain any OOIs, as a result of an analysis of the captured sensor data using computer object detection. The former option (transmission at a lower quality) still allows the operator to review sensor data which do not contain any OOIs, but in a manner which uses less bandwidth on the wireless communications channel, thereby freeing up bandwidth on the channel for potential parallel operations which are competing for bandwidth, such as streams from other DCs 102 operating in the same area, for example. In embodiments, the second transmission rate (i.e., that at which the second subset of sensor data not containing the OOI is transmitted) is equal to or less than this default transmission rate, i.e., it could also be zero.

It should be appreciated that the aspects described in the preceding paragraph are generic to different types of sensor data collected by the DC 102. However, the following description considers the case where the DC 102 comprises a video capture device 103 (VCD), such that the sensor data comprises video data. In such embodiments, performing computer object detection comprises operating a computer vision system 126 initialized with a training set corresponding to OOIs 110. Example OOIs 110 include, but are not limited to, tanks, armored vehicles, aircraft, trucks, cars, humans and the like. In embodiments, other objects which do not form part of the training set are identified by the computer vision system, but as they are not OOIs 110, there is no subsequent generation of first and second subsets of the sensor data and performance of associated actions based thereon. In embodiments, the computer vision system may only identify objects that are in the positive training set. This may provide a more performant solution, since the computer vision system ignores objects where are not in the training set.

In embodiments, the steps of generating and transmitting the first and second subsets of the sensor data are performed on the basis that movement of the OOI 110 is identified within the sensor data collected by the DC 102. In this manner, mere detection of a stationary object of interest, such as a parked aircraft, is not sufficient to trigger the DC 102 to transmit first and second subsets of sensor data to the SN 106. Instead, it is additionally required that the OOI 110 is undergoing motion of some form. In some embodiments, different types of movement/motion may also be distinguished by the computer object detection. For example, an aircraft which is undergoing a taxiing maneuver may not trigger the DC 102 to transmit first and second subsets of sensor data to the SN 106, whereas an aircraft accelerating on a runway, or in flight, may do. As such, in embodiments, the identified movement is a pre-determined type of movement, such that not all types of movement cause the steps of generating and transmitting the first and second subsets of sensor data.

Figure 2:
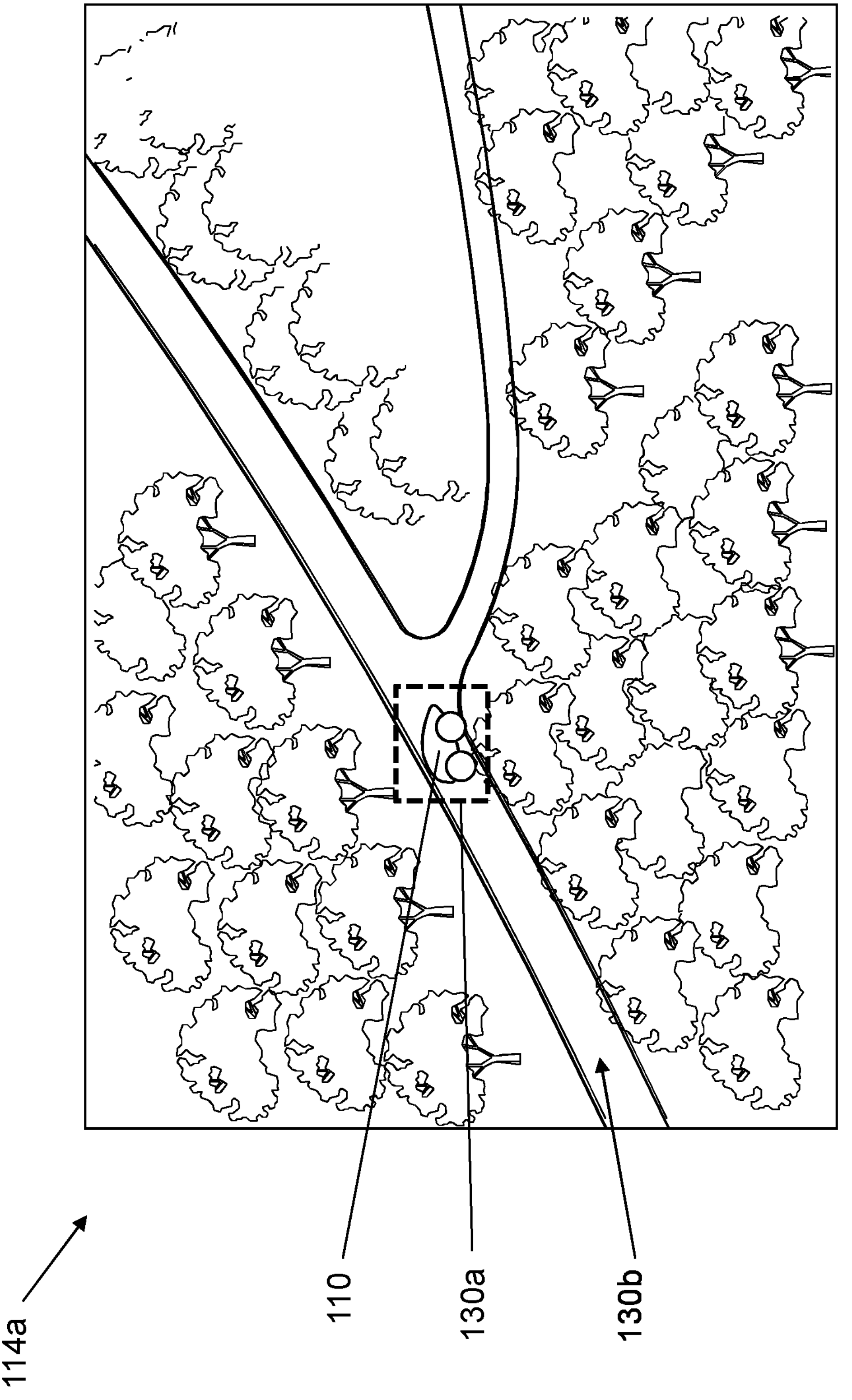
FIG. 2 shows first and second subsets of sensor data at the mobile data collector according to embodiments of the present disclosure.

In embodiments, with reference to FIG. 2, the first and second subsets of the raw, captured sensor data 114*a* at the DC 102 correspond to respective first 130*a* and second 130*b* spatial regions of frames of the video data, the first spatial region 130*a* comprising the OOI 110 (e.g., a vehicle). It will be understood that each frame of the video data corresponds to an image. In general, the first 130*a* and second 130*b* spatial regions are non-overlapping, and may together fully span frames of the captured video data 114*a*, i.e., such that if the first 130*a* and second 130*b* spatial regions are added together, the result is the full image/frame.

In embodiments, the first subset of the sensor data 130*a* is transmitted from the DC 102 to the SN 106 at a first frame rate and the second subset of the sensor data 130*b* is transmitted from the DC 102 to the SN 106 at a second frame rate. The second frame rate is lower than the first frame rate. In this manner, per unit area of the video frames, the bandwidth on the wireless communications channel 108 required for transmission of the second subset of the sensor data 130*b* is less than for transmission of the first subset of the sensor data 130*a*. This is at the expense of a reduced transmitted frame rate for the second subset of the sensor data 130*b*. However, since the second subset of the sensor data 130*b* does not comprise the OOI 110, this is typically an acceptable trade-off.

In embodiments, the first subset of the sensor data 130*a* is transmitted from the DC 102 to the SN 106 at a first resolution and the second subset of the sensor data 130*b* is transmitted from the DC 102 to the SN 106 at a second resolution. The second resolution is lower than the first resolution. In this manner, per unit area of the video frames, the bandwidth on the wireless communications channel 108 required for transmission of the second subset of the sensor data 130*b* is less than for transmission of the first subset of the sensor data 130*a*. This is at the expense of a reduced resolution for the second subset of the sensor data 130*b*. However, since the second subset of the sensor data 130*b* does not comprise the OOI 110 this is typically an acceptable trade-off.

In embodiments, the first subset of the sensor data 130*a* is transmitted from the DC 102 to the SN 106 at a first color depth and the second subset of the sensor data 103*b* is transmitted from the DC 102 to the SN 106 at a second color depth. The second color depth is lower than the first color depth. Color depth defines the number of bits per pixel, or in general the amount of information per unit area of an image, used to define the color of each pixel or unit area of an image. As such, a lower color depth means that fewer bits per pixel (or less information per unit area) are used to define the color of each pixel. In this manner, per unit area of the video frames, the bandwidth on the wireless communications channel 108 required for transmission of the second subset of the sensor data 130*b* is less than for transmission of the first subset of the sensor data 130*a*. This is at the expense of a reduced color depth for the second subset of the sensor data 130*b*. However, since the second subset of the sensor data 130*b* does not comprise the OOI 110 this is typically an acceptable trade-off. For example, the second subset of the sensor data 130*b* may be transmitted in greyscale, whereas the first subset of the sensor data 130*a*, containing the OOI 110, may be transmitted with a color depth corresponding to the maximum supported by the VCD 103.

In embodiments, the first subset of the sensor data 130*a* is transmitted from the DC 102 to the SN 106 at a first compression ratio and the second subset of the sensor data 130*b* is transmitted from the DC 102 to the SN 106 at a second compression ratio. The second compression ratio is greater than the first compression ratio. In this manner, per unit area of the video frames, the bandwidth on the wireless communications channel 108 required for transmission of the second subset of the sensor data 130*b* is less than for transmission of the first subset of the sensor data 130*a*. This is at the expense of increased compression of the second subset of the sensor data 130*b*, potentially losing detail and introducing artefacts in the usual manner encountered under high compression. However, since the second subset of the sensor data 130*b* does not comprise the OOI 110 this is typically an acceptable trade-off.

Figures 3A, 3B, 3C, 3D:
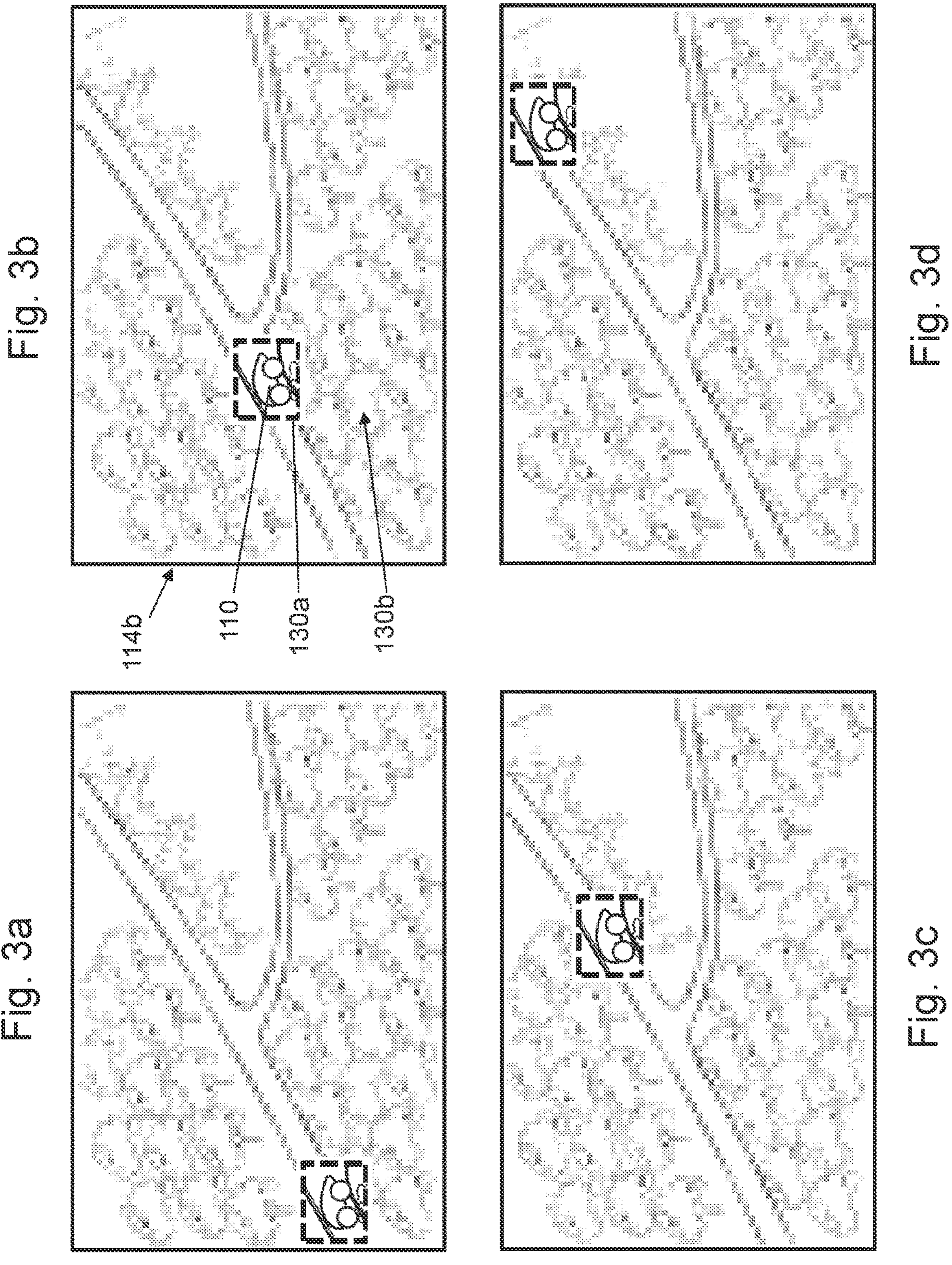
FIGS. 3*a*-3*d*, 4*a*-4*d* and 5 show examples of transmitted sensor data corresponding to video data transmitted from the mobile data collector to the supervising node according to embodiments of the present disclosure.
Figures 4A, 4B, 4C, 4D:
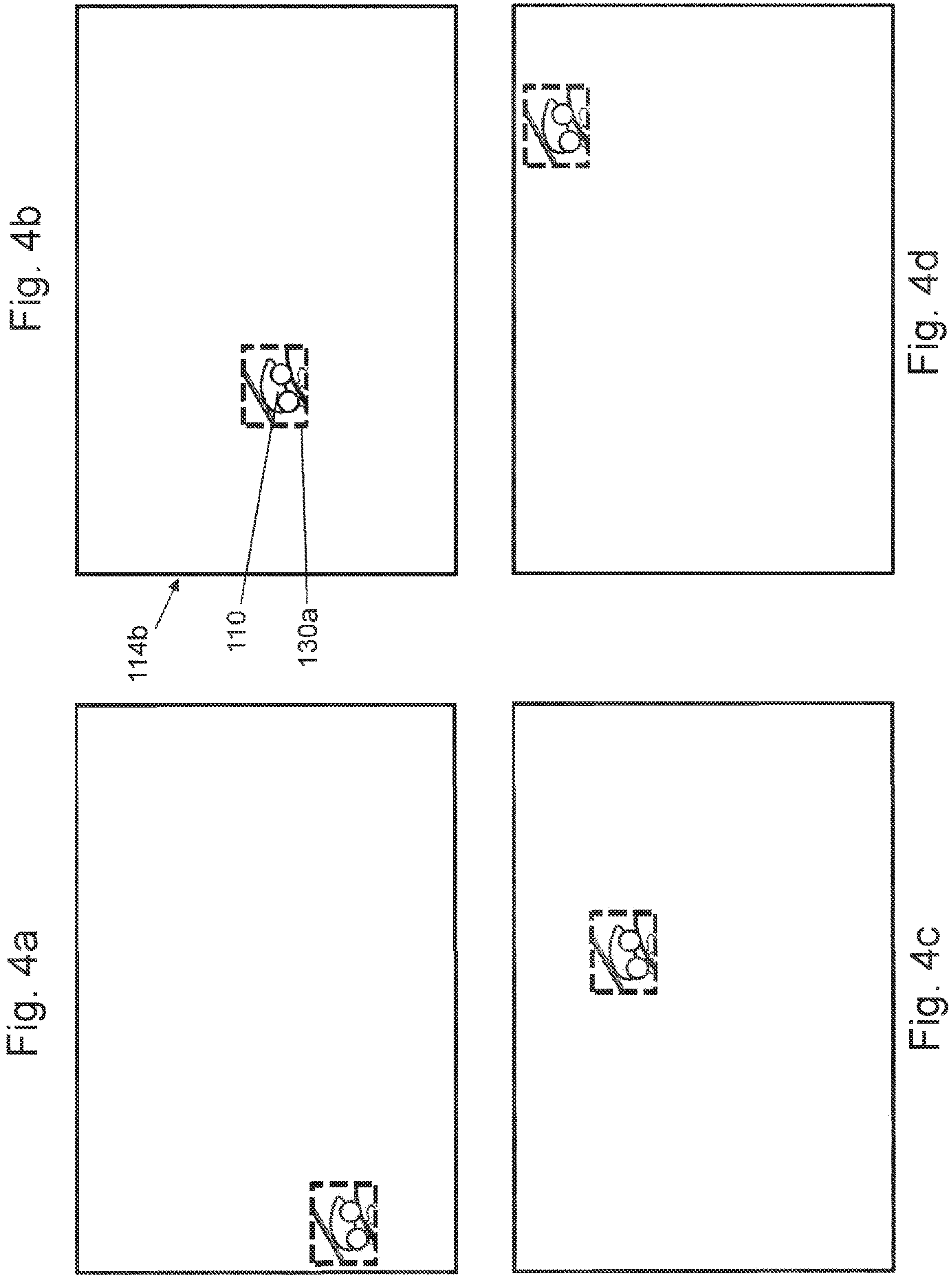

FIGS. 3*a*-3*d* illustrate an example video feed 114*b* reconstructed at the SN 106 from first 130*a* and second subsets 130*b* of video data transmitted by the DC 102, where each of the FIGS. 3(*a*)-3(*d*) denote data received at consecutive points in time. The first subset of the sensor data 130*a*, containing the OOI 110, is transmitted from the DC 102 to the SN 106 at a higher resolution than the second subset of the sensor data 130*b*. In this manner, the amount of bandwidth on the channel 108 required for transmission of the overall video data from the DC 102 to the SN 106 is reduced, without losing valuable information pertaining to the portion of each video frame containing the OOI 110. For example, in general the second subset of the video data 130*b* contains contextual information, such as a road layout for example, and no valuable information is lost when transmitting it at a lower resolution compared to the first subset of the video data 130*a*. Similar considerations apply in respect of frame rate, color depth and/or compression ratio.

In order to assist in reconstructing the received video data at the SN 106 to produce a representation of the scene 114*b*, in embodiments metadata is also transmitted from the DC 102 to the SN 106 alongside the first 130*a* and second subsets 130*b* of the sensor data. For example, such metadata may comprise coordinates of the first spatial region corresponding to the first subset 130*a* within frames of the video data. This enables the two subsets to be correctly registered together at the SN 106. Such metadata could comprise X, Y coordinate pairs corresponding to the top left corner and bottom right corner of the first subset of the sensor data 130*a*, for example. In embodiments, the metadata may comprise the type of object of interest identified, for example whether it is an aircraft or a tank. It should be appreciated that this applies to all types of sensor data.

Figure 5:
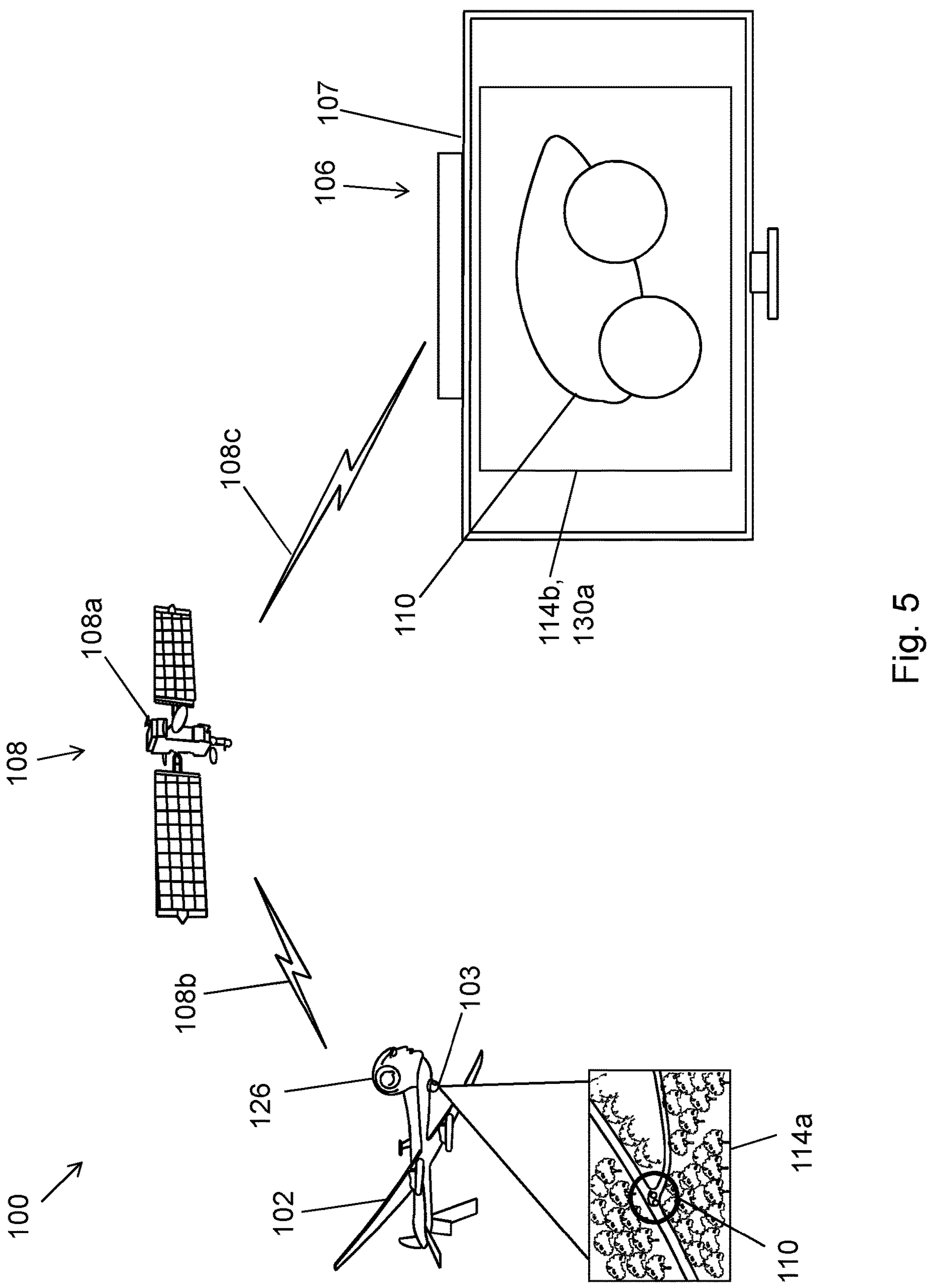

In some scenarios, it may be deemed unnecessary for an operator of the SN 106 to have contextual information corresponding to the second subset of the sensor data 130*b*. With reference to FIGS. 4*a*-4*d*, the separate figures denote data received at consecutive points in time, in such scenarios, the first subset of the sensor data 130*a* is transmitted from the DC 102 to the SN 106 (i.e., the transmission rate for the second subset of the sensor data 130*b* is zero). Metadata as described above may still be transmitted in order to place to the transmitted first subset 130*a* at the correct location within the video frame at the SN 106. Alternatively, the SN 106 may receive and display the first subset of the sensor data 130*a* containing the object of interest 110, as illustrated in FIG. 5. In this manner, bandwidth on the wireless communications channel 108 is primarily consumed for transmission of the highly pertinent sensor data 130*a* containing the object of interest 110. Furthermore, an operator of the SN 106 is presented with the pertinent intelligence, thereby aiding the operator in making a more focused assessment of the intelligence. It should be appreciated that in embodiments involving multiple mobile data collectors, the operator of the SN 106 may, if operating as described above, see pertinent intelligence corresponding directly to detected OOIs. This reduces bandwidth usage on the channel 108, facilitates the operator in making assessments of the pertinent intelligence data, and enables that pertinent data to be transmitted at a higher quality than would be the case if the full data captured by each DC 102 were transmitted in full to the SN 106.

In embodiments, the computer object detection is performed locally on the DC 102. For example, the DC 102 may comprise a computer vision processor 126 which is operable to locally process sensor data collected by the DC 102 in order to perform computer object detection. It should be appreciated that by processing sensor data locally on the DC 102, computer object detection functionality (for example a computer detection algorithm) can be provided with raw data from the sensors, rather than sensor data that may already have been compressed and/or otherwise processed for transmission towards the SN 106. This is likely to result in more accurate performance of the computer object detection. Nevertheless, in some embodiments, some or all of the computer objection detection, and consequent transformation of the sensor data into first and second subsets, is performed on an intermediate node between the DC 102 and the SN 106. This intermediate node could be a system operating on a helicopter or on a satellite, for example, which is in communication with DCs 102 such as drones and also in communication with a remote SN 106, e.g., via the satellite 108*a*.

In embodiments, each OOI 110 is assigned a corresponding weighting factor which is used to determine the first and second transmission rates from the DC 102 to the SN 106 when the DC 102 has the particular OOI 110 within its sensor field of view. This is because certain OOIs 110 may warrant transmission of higher quality imagery to the SN 106 than other OOIs. For example, a human OOI 110 may be assigned a larger weighting factor than a vehicular OOI 110, in order to assist in recognizing the identity of the human at the SN 106. The weighting factor of each OOI may be representative of a "level of interest" associated with each OOI.

In embodiments, an operator of the SN 106 may be alerted when an OOI 110 is identified. The alert could be delivered in one or more of several different manners. For example, an audible alert, a visual alert, a text or instant message, or an email. The operator may then select a computerized function on the SN 106 in order to cause the first and second transmission rates to be manually adjusted, for example.

Figure 6:
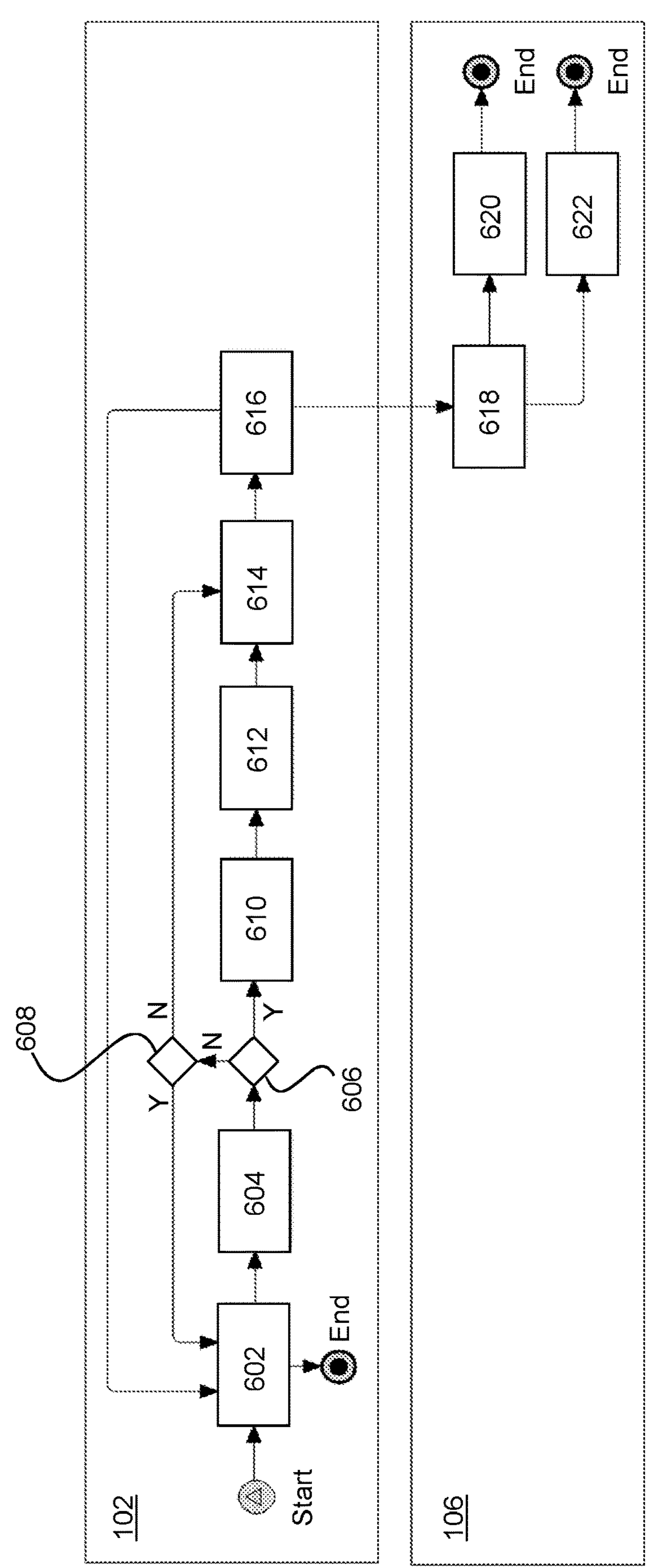
FIG. 6 shows processing of sensor data at the mobile data collector and the supervising node according to embodiments of the present disclosure.

FIG. 6 illustrates processing of sensor data at the DC 102 and SN 106 according to embodiments. The process starts at block 602 where the next source frame is read. In this embodiment, this is the next frame of video data from a video capture device 103 on the DC 102. If there is no further source frame to be read, the process ends. Otherwise, at block 604 computer object detection identifies whether an object of interest 110 is present in the frame.

At decision block 606, if an object of interest is identified in the frame, the process proceeds to block 610, where the object of interest is added to metadata, such as described above. Next, at block 612 the frame is transformed into a first subset associated with the object of interest, and a second subset of the sensor data not associated with the object of interest. At block 614 the first and second subsets are encoded for transmission to the SN 106 and actual transmission to the SN 106 takes place at block 616. Block 618, at the SN 106, consists of receiving the transmitted first and second subsets from the DC 102. At block 620 the frame is reconstructed and rendered, e.g., for display on the display 107 of the SN 106. Optionally, at 622, data received from the DC 102 are transmitted onwards to another node, such as a further SN 106, for example.

At decision block 606, if an object of interest is not identified in the frame the process proceeds to decision block 610, which asks whether a time limit since an object of interest 110 was last detected has expired. If it has expired, Y, the process returns to block 602 to read the next source frame. If it hasn't expired, N, the process jumps to block 614 to continue to stream the data towards the SN 106. In this manner, a buffer period is provided during which sensor data are continued to be streamed from the DC 102 to the SN 106 for a pre-determined period of time after the object of interest 110 was last detected.

Figure 7:
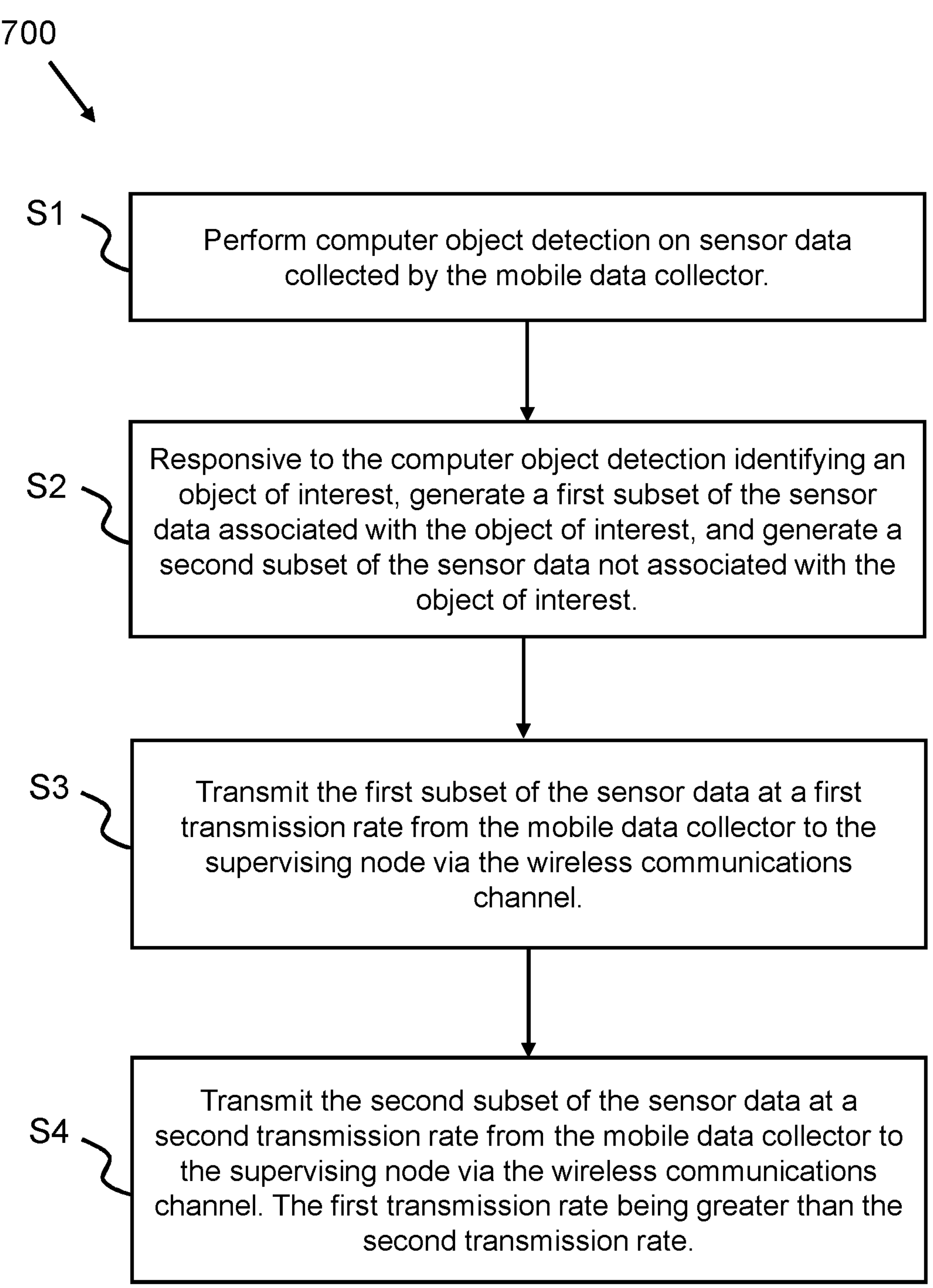
FIG. 7 is a flow diagram representing transmission of sensor data according to embodiments of the present disclosure.

FIG. 7 is a flow diagram representing transmission of sensor data according to embodiments of the present disclosure. At step S1, computer object detection is performed on sensor data collected by the DC 102. At step S2, responsive to the computer object detection identifying an OOI 110 in the sensor data, a first subset 130*a* of the sensor data is generated, associated with the OOI 110, and a second subset 130*b* of the sensor data is generated, not associated with the OOI 110. At step S3, the first subset 130*a* is transmitted from the DC 102 to the SN 106 at a first transmission rate. At step S4, which may in general be concurrent with step S3, the second subset 130*b* is transmitted from the DC 102 to the SN 106 at a second transmission rate. The first transmission rate is greater than the second transmission rate.

It should be appreciated that while the foregoing embodiments are described in the context of a single DC 102, the present disclosure also extends to apparatuses comprising more than one DC 102 in communication with a single SN 106. The skilled person would be able to make the relevant adjustments, in view of the present disclosure, to apply the concepts disclosed herein to a system comprising two or more DCs.

The first DC 102 and SN 106 as described above may each be comprised in or implemented in apparatus comprising a processor or processing system. The processing system may comprise one or more processors and/or memory. One or more aspects of the embodiments described herein comprise processes performed by apparatus. In some examples, the apparatus comprises one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device, etc.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms “comprise” or “comprising” do not exclude other elements or steps, the terms “a” or “one” do not exclude a plural number, and the term “or” means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of transmitting sensor data from a mobile data collector to a supervising node over a wireless communications channel, the method comprising:

performing computer object detection on sensor data collected by the mobile data collector;

responsive to the computer object detection identifying an object of interest within the sensor data collected by the mobile data collector, generating a first subset of the sensor data associated with the object of interest, and generating a second subset of the sensor data not associated with the object of interest;

transmitting the first subset of the sensor data at a first transmission rate from the mobile data collector to the supervising node via the wireless communications channel;

transmitting the second subset of the sensor data at a second transmission rate from the mobile data collector to the supervising node via the wireless communications channel;

assigning to each object of interest a corresponding weighting factor which is used to determine the first transmission rate, wherein the first transmission rate is greater than the second transmission rate, and, wherein the step of performing computer object detection comprises operating a computer vision system initialized with a training set corresponding to objects of interest.

2. The method of claim 1, further comprising prior to the computer object detection identifying an object of interest within the sensor data collected by the mobile data collector, transmitting sensor data collected by the mobile data collector at a default transmission rate from the mobile data collector to the supervising node via the wireless communications channel.

3. The method of claim 2, wherein the default transmission rate is less than the first transmission rate.

4. The method of claim 2, wherein the default transmission rate is zero.

5. The method of claim 2, wherein the second transmission rate is equal to or less than the default transmission rate.

6. The method of claim 5, wherein the second transmission rate is zero.

7. The method of claim 1, further comprising identifying movement of the object of interest within the sensor data collected by the mobile data collector, wherein the steps of generating and transmitting the first and second subsets of the sensor data are performed further based on the identified movement.

8. The method of claim 7, wherein the identified movement is a pre-determined type of movement.

9. The method of claim 1, wherein the first and second subsets of the sensor data correspond to sensor data collected at different points in time.

10. The method of claim 1, wherein the sensor data comprise image data, wherein the first and second subsets of the sensor data correspond to respective first and second spatial regions of individual images of the image data and wherein the first spatial region comprises the object of interest.

11. The method of claim 10, wherein the first and second spatial regions together fully span individual images of the image data.

12. The method of claim 10, wherein the image data comprise video data, wherein the first subset of the sensor data is transmitted from the mobile data collector to the supervising node at a first frame rate and the second subset of the sensor data is transmitted from the mobile data collector to the supervising node at a second frame rate, and wherein the second framerate is lower than the first frame rate.

13. The method of claim 10, wherein the first subset of the sensor data is transmitted from the mobile data collector to the supervising node at a first resolution and the second subset of the sensor data is transmitted from the mobile data collector to the supervising node at a second resolution, and wherein the second resolution is lower than the first resolution.

14. The method of claim 10, wherein the first subset of the sensor data is transmitted from the mobile data collector to the supervising node at a first color depth and the second subset of the sensor data is transmitted from the mobile data collector to the supervising node at a second color depth, wherein the second color depth is lower than the first color depth.

15. The method of claim 10, wherein the first subset of the sensor data is transmitted from the mobile data collector to the supervising node at a first compression ratio and the second subset of the sensor data is transmitted from the mobile data collector to the supervising node at a second compression ratio, and wherein the second compression ratio is greater than the first compression ratio.

16. The method of claim 10, further comprising transmitting metadata from the mobile data collector to the supervising node via the wireless communications channel, wherein the metadata comprises coordinates of the first spatial region within individual images of the image data, or the metadata comprises the type of object of interest identified.

17. The method of claim 16, further comprising reconstructing, at the supervising node, the image data or video data from the transmitted first and second subsets of the sensor data and the metadata.

18. The method of claim 1, wherein the sensor data comprise at least one of electromagnetic spectrum data or audio data, and wherein the first and second subsets of the sensor data correspond to respective first and second frequency ranges of the sensor data.

19. An apparatus comprising a mobile data collector connected to a supervising node over a wireless communications channel, the apparatus being configured to:

perform computer object detection on sensor data collected by the mobile data collector;

responsive to the computer object detection identifying an object of interest within the sensor data collected by the mobile data collector, generate a first subset of the sensor data associated with the object of interest, and generate a second subset of the sensor data not associated with the object of interest;

transmit the first subset of the sensor data at a first transmission rate from the mobile data collector to the supervising node via the wireless communications channel;

transmit the second subset of the sensor data at a second transmission rate from the mobile data collector to the supervising node via the wireless communications channel;

assigning to each object of interest a corresponding weighting factor which is used to determine the first transmission rate, wherein the first transmission rate is greater than the second transmission rate, and, wherein the step of performing computer object detection comprises operating a computer vision system initialized with a training set corresponding to objects of interest.

20. A non-transitory computer readable medium storing a computer program comprising a set of instructions, which, when executed by a computerized apparatus, cause the computerized apparatus to perform a method of transmitting sensor data from a mobile data collector to a supervising node over a wireless communications channel, the method comprising:

performing computer object detection on sensor data collected by the mobile data collector;

responsive to the computer object detection identifying an object of interest within the sensor data collected by the mobile data collector, generating a first subset of the sensor data associated with the object of interest, and generating a second subset of the sensor data not associated with the object of interest;

transmitting the first subset of the sensor data at a first transmission rate from the mobile data collector to the supervising node via the wireless communications channel;

transmitting the second subset of the sensor data at a second transmission rate from the mobile data collector to the supervising node via the wireless communications channel;

assigning to each object of interest a corresponding weighting factor which is used to determine the first transmission rate, wherein the first transmission rate is greater than the second transmission rate, and, wherein the step of performing computer object detection comprises operating a computer vision system initialized with a training set corresponding to objects of interest.

* * * * *